United States Patent
Wein et al.

(10) Patent No.: US 9,242,439 B2
(45) Date of Patent: Jan. 26, 2016

(54) APPARATUS AND METHOD FOR WELDING

(71) Applicant: MS Spaichingen GmbH, Spaichingen (DE)

(72) Inventors: Joachim Wein, Deißlingen (DE); Hartmut Poll, Deißlingen (DE); Elmar Noder, Bösingen (DE); Clemens Balle, Trossingen (DE)

(73) Assignee: MS SPAICHINGEN GMBH, Spaichingen (DE)

( * ) Notice: Subject to any disclaimer, the term of this patent is extended or adjusted under 35 U.S.C. 154(b) by 582 days.

(21) Appl. No.: 13/682,460

(22) Filed: Nov. 20, 2012

(65) Prior Publication Data
US 2013/0153115 A1  Jun. 20, 2013

(30) Foreign Application Priority Data

Nov. 25, 2011 (DE) .................... 10 2011 119 444

(51) Int. Cl.
*B32B 37/00* (2006.01)
*B32B 37/06* (2006.01)
(Continued)

(52) U.S. Cl.
CPC ................ *B32B 37/06* (2013.01); *B23K 20/10* (2013.01); *B26D 5/00* (2013.01); *B26D 7/086* (2013.01); *B29C 65/08* (2013.01); *B29C 65/7443* (2013.01); *B29C 66/0062* (2013.01); *B29C 66/1122* (2013.01); *B29C 66/43* (2013.01); *B29C 66/7352* (2013.01); *B29C 66/81262* (2013.01); *B29C 66/81463* (2013.01); *B29C 66/8242* (2013.01); *B29C 66/8322* (2013.01); *B29C 66/92311* (2013.01);
(Continued)

(58) Field of Classification Search
CPC .. B29C 65/08; B29C 66/961; B29C 66/0062; B29C 66/7352; B29C 66/81262; B29C 66/81463; B29C 66/8242; B29C 66/92311; B29C 66/92441; B29C 66/92611; B29C 66/9516; B29C 66/1122; B29C 66/43; B29C 65/7443
USPC ............. 156/64, 73.1, 367, 378, 580.1, 580.2
See application file for complete search history.

(56) References Cited

U.S. PATENT DOCUMENTS

| 4,047,992 A | 9/1977 | Williams et al. |
| 5,213,249 A * | 5/1993 | Long et al. .................... 228/102 |

(Continued)

FOREIGN PATENT DOCUMENTS

| DE | 0154 343 A1 | 3/1982 |
| DE | 33 34 066 A1 | 3/1984 |
| DE | 102 31 742 B3 | 1/2004 |
| DE | 10 2009 046 319 A1 | 5/2011 |
| GB | 2 373 207 A | 9/2002 |

OTHER PUBLICATIONS

English Translation and Original International Search Report Issued in EP Application No. 12192366.8-1706 on Feb. 8, 2013, 7 pages.

(Continued)

*Primary Examiner* — James Sells
(74) *Attorney, Agent, or Firm* — Kilpatrick Townsend Stockton LLP

(57) ABSTRACT

In an apparatus and a method for welding of workpiece layers, a feed device is activated with a predefined adjustment force without ultrasound activation and the sonotrode is advanced in the direction of an anvil. The adjustment force is subsequently reduced and the sonotrode is activated. The sonotrode can subsequently be deactivated and the adjustment force can be increased on the basis of a deactivation signal.

19 Claims, 1 Drawing Sheet

Figure 1:
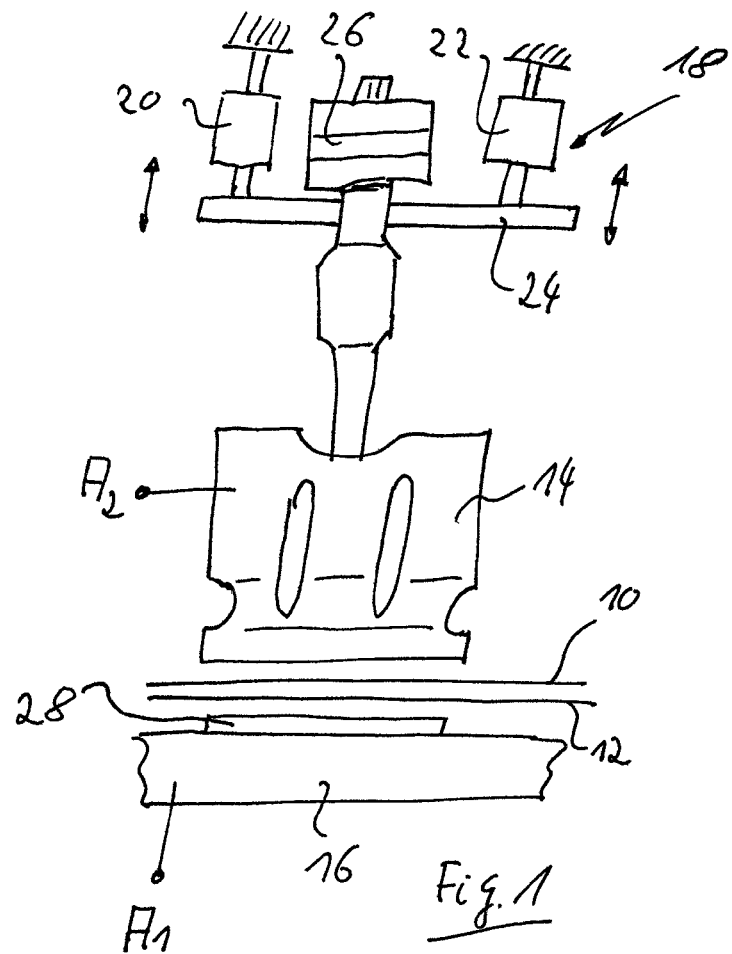

(51) Int. Cl.
  *B29C 65/08* (2006.01)
  *B29C 65/74* (2006.01)
  *B29C 65/00* (2006.01)
  *G01B 7/14* (2006.01)
  *B26D 5/00* (2006.01)
  *B26D 7/08* (2006.01)
  *B23K 20/10* (2006.01)

(52) U.S. Cl.
  CPC .... *B29C 66/92441* (2013.01); *B29C 66/92611* (2013.01); *B29C 66/9516* (2013.01); *B29C 66/961* (2013.01); *G01B 7/14* (2013.01); *B29C 66/929* (2013.01); *Y10T 83/04* (2015.04); *Y10T 83/088* (2015.04)

(56) References Cited

U.S. PATENT DOCUMENTS

2004/0050474 A1   3/2004   Kubik et al.
2004/0232208 A1   11/2004  Kondo

OTHER PUBLICATIONS

German Search Report mailed on Sep. 6, 2012 for German Patent Application No. 10 2011 119 444.8, with English Translation, 11 pages.

\* cited by examiner

APPARATUS AND METHOD FOR WELDING

This application claims priority to German Application No. 10 2011 119 444.8, filed Nov. 25, 2011, the disclosure of which is incorporated by reference herein.

The present invention relates to an apparatus and to a method for welding or for cutting and sealing workpiece layers by means of ultrasound. Such apparatus and methods are generally known and serve to weld the workpiece layers, for example plastic, films or also other material layers, together and in this respect optionally also to cut off a projecting margin next to the weld seam.

In this respect a sonotrode is used for welding the materials which can be adjusted relative to an anvil by means of a feed device, with the required ultrasonic energy being coupled into the sonotrode by an ultrasound generator. It is problematic with such arrangements that with relatively thin workpiece layers, for example films to be welded together, damage to the sonotrode or to the anvil takes place when the sonotrode acted on by ultrasound impacts against the sonotrode. This also applies with thin workpiece layers when they are still located between the anvil and the sonotrode. In the case of cutting and sealing, the two workpiece layers have anyway been cut through at this point in time so that a direct contact between the anvil and the sonotrode also takes place in this case.

To prevent damage or wear of the sonotrode and the anvil, it is known from the prior art to insert a so-called sacrificial film between the anvil and the sonotrode which is comparatively thick and provides a mechanical protection between the sonotrode and the anvil. Such a sacrificial film, however, means additional costs since it has to be provided, processed and subsequently disposed of again.

It is the object of the present invention to provide an apparatus and a method for welding or for cutting and sealing by means of ultrasound with which the use of a sacrificial film can be dispensed with in a very simple and inexpensive manner.

This object is satisfied by the features of the independent claims and in an apparatus in accordance with the invention in particular in that a detector device is provided which detects an electrical resistance between the sonotrode and the anvil and which generates a deactivation signal for the sonotrode and/or the feed device in dependence on the determined resistance.

In accordance with the invention, a spacing between the sonotrode and the anvil is thus detected by a kind of proximity sensor which is formed in a simple manner in that the electrical resistance between the sonotrode and the anvil is determined. In this respect, the invention is based on the recognition that the contact resistance already falls on the convergence of the sonotrode and the anvil so that a preemptive recognition of the just impending intimate contact is already possible before a final contact of the two components which could cause damage or wear so that the sonotrode can be switched off and/or the feed device can be stopped or its direction reversed before an actual contact. This recognition or detection takes place in the region of the last micrometers of the feed motion due to the vibration amplitude of the sonotrode in the micrometer range.

Advantageous embodiments of the invention are described in the description, in the drawing and in the dependent claims.

In a first advantageous embodiment, the detector device can have a terminal point at the sonotrode and a terminal point at the anvil, with both terminal points being connected to a current source and with an electric load resistor being connected between the two terminal points. Such an arrangement offers the great advantage that static charges which can, for example, frequently occur on a welding of two films are led off by the resistor connected between the anvil and the sonotrode. By measuring the voltage applied over the load resistor, it can then be determined in a very simple, insensitive and also temperature-stable manner whether the anvil and the sonotrode are still spaced apart from one another or whether these two components are approaching one another. With a sufficiently small spacing, i.e. with a starting contact of the two components, the resistance between these two components starts to fall so that the voltage measured over the load resistor drops. As soon as the voltage has reached a lower threshold value, the ultrasound generator can be switched off and/or the feed device can be stopped or its feed direction can be reversed.

It can be advantageous in this respect if the load resistance is variable since an adaptation to different material thicknesses of the workpiece layers can hereby take place.

It can be advantageous to form the load resistor as low ohm, for example in the range from approximately 50Ω to 2 kΩ in particular in the range from approximately 500Ω to approximately 1.5 kΩ. The charges arising in the region of the workpiece layers, for example of the films to be welded, can be led off particularly easily by a low-ohm load resistor.

It can furthermore be advantageous to form the current source as a constant current source which generates a current of approximately 5 mA to 1 A, in particular approximately 10 to 30 mA. Such a constant current source can be manufactured inexpensively.

The above-described apparatus has a simple design, is robust, inexpensive and temperature-stable since at most the no-load voltage measured over the load resistor varies with a varying external temperature.

In accordance with a further advantageous embodiment, the detector device can include a voltmeter which measures the voltage over the load resistor for determining the resistance between the sonotrode and the anvil, with a comparator being provided which compares the measured voltage with a limit value which can be set. A collision between the sonotrode and the anvil can be reliably avoided with the aid of such a simple comparator circuit.

In accordance with a further advantageous embodiment, it can be advantageous to use a common anvil with a plurality of sonotrodes, with each sonotrode being provided with its own detector device. In this respect, only one single common terminal point for all detector devices can be provided at the anvil. It is in this manner possible to weld a plurality of products simultaneously in a single workstep. Provision is made in this respect that an individual contact switch-off is carried out for every single sonotrode even with different tolerances in the region of the different sonotrodes. It can also be advantageous to design the anvil as multipart to provide an individual counter surface for every single sonotrode, with then the contact switch-off being able to be carried out via the respective associated anvil and the sonotrodes in this respect being able to lie on the same electrical potential.

In the aforesaid embodiment, it can also be advantageous to fasten a plurality of sonotrodes to a common carrier, with the individual sonotrodes being electrically insulated from one another to ensure the individual contact switch-off of each sonotrode.

In accordance with a further aspect of the invention, it relates to a method for welding or for cutting and sealing workpiece layers by means of ultrasound using an apparatus of the above-described kind, with the following steps being carried out, in particular in the order named below: a) activating the feed device at a predefined adjustment force without activating the sonotrode or with activating the sonotrode at a low amplitude and adjusting the sonotrode in the direction of the anvil to compress the workpiece layers; b) reducing the adjustment force; c) activating the sonotrode or increasing the amplitude to a higher value; and d) deactivating the sonotrode and increasing the adjustment force, in particular to approximately the original value, when the detector device has generated a deactivation signal.

In the above-named method, the tolerances are first removed from the system in step a) and the workpiece layers to be welded are compressed. The precondition is set by reducing the adjustment force in step b) that the sonotrode can be activated or can be activated more strongly in step c) without a contact with the anvil already having taken place. As soon as then the detector device has generated a deactivation signal in step d), the sonotrode can be deactivated so that damage to the sonotrode and anvil is precluded. Subsequently, the adjustment force can be increased again, which can in particular be advantageous in the case of cutting and sealing to completely cut the sections to be cut off.

It can be advantageous to select the reduced adjustment force so that it amounts to approximately half the predefined adjustment force.

It can furthermore be advantageous also to deactivate the sonotrode when the detector device has not generated any deactivation signal, but the sonotrode was acted on by a predefined maximum energy or over a predefined time. It is ensured in this case that a satisfactory weld seam is also generated if no deactivation signal has been generated on the basis of tolerances or the like. A proper cutting and sealing can also be implemented in this case by increasing the adjustment force after deactivating the sonotrode in method step d).

Figure 2:
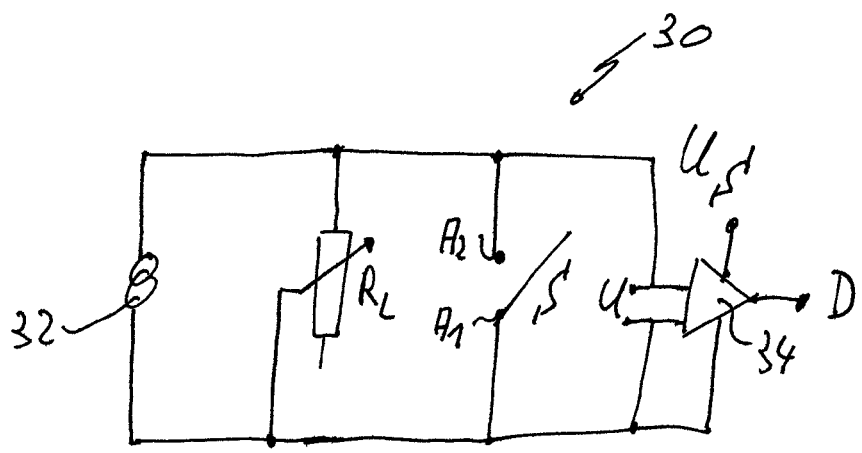

The present invention will be described in the following purely by way of example with reference to an advantageous embodiment and to the enclosed drawings. There are shown:

FIG. 1 a schematic side view of an apparatus for welding or for cutting and sealing; and FIG. 2 a circuit diagram of the detector device used.

FIG. 1 shows in a purely schematic and exemplary manner a side view of an apparatus for welding or for cutting and sealing workpiece layers by means of ultrasound, with the embodiment shown being an apparatus for cutting and sealing two films 10 and 12 which are welded and cut with the aid of a sonotrode 14 which can be moved toward an anvil 16.

In the embodiment shown, a feed device 18 serves to adjust the sonotrode toward the anvil, said feed device including two positioning cylinders, for example pneumatic cylinders 20 and 22, and with whose aid a receiver 24 can be moved in the vertical direction along the double arrow shown to adjust the sonotrode fastened at the receiver 24 in the direction of the anvil 16. An ultrasound generator is designated by the reference numeral 26.

The anvil 16 can in principle have any desired shape, for example it can be of plate shape or also of roller shape, and in the embodiment shown it has a cutting and sealing section 28 which serves in cooperation with the sonotrode 14 first to weld the films 10, 12 to one another and then to cut them off outside the weld seam.

It is understood that the above-described embodiment is purely exemplary and that it generally does not play any role whether the sonotrode is moved in the direction of the anvil or whether the sonotrode is stationary and the anvil is moved in the direction of the sonotrode or whether both components are moved simultaneously. The anvil can also be arranged above the sonotrode and the sonotrode beneath the anvil. It is furthermore possible to provide a common anvil 16 and a plurality of sonotrodes 14 to be able to carry out a plurality of weld processes simultaneously in one workstep. It can be advantageous in this connection to fasten the sonotrodes to the common receiver 14—mechanically decoupled from one another under certain circumstances—but to insulate them electrically from one another.

As FIG. 1 further illustrates, an electric terminal point $A_1$ is provided at the anvil which is composed of electrically conductive material and an electric terminal point $A_2$ is provided at the sonotrode 14 which is likewise composed of electrically conductive material. Both terminal points serve for connection to a detector device which will be explained in more detail in connection with FIG. 2.

The detector device 30 shown schematically in FIG. 2 has a constant current source 32 which is connected to the terminal point $A_1$ at the anvil 16 and to the terminal point $A_2$ at the sonotrode 14. A variable or adjustable load resistor $R_L$ is connected in parallel to the current source 32 and to the two terminal points $A_1$ and $A_2$ so that the load resistor $R_L$ is short-circuited by an electrical contact between the sonotrode 14 and the anvil 16 which is symbolized by a switch symbol S.

A comparator 34 which compares the voltage applied via the switch S or at the load resistor $R_L$ with a threshold value $U_S$, which can be preset, is connected in parallel to the load resistor $R_L$ and the switch S in the detector device 30. As soon as the voltage applied at the load resistor $R_L$ has reached the preset threshold value voltage $U_S$, the comparator 34 outputs a deactivation signal D which has the result with the aid of a control not shown in any more detail that the sonotrode 14 is switched off and/or that the feed device 18 is stopped or its feed direction is reversed.

On a welding or cutting and sealing using the above-described apparatus, the feed device 18 is first actuated without an activated sonotrode 14 so that the films 10 and 12 are compressed and are clamped between the sonotrode 14 and the anvil 16. Subsequently, the feed force of the feed device 18 is reduced (for example, the pressure in the positioning cylinders 20 and 22 can be reduced from 3.5 bar to 1.5 bar) so that subsequently the sonotrode 14 can be activated by switching off the ultrasound generator 26. Subsequently to this, a welding of the films 10 and 12 takes place as well as (in the case of cutting and welding) a subsequent cutting off of a marginal region. As soon as the sonotrode 14 and the anvil 16 have approached one another sufficiently in this case, the resistance between these two components is reduced and the voltage U over the load resistor $R_L$ drops. When the voltage drop has reached a predefined value $U_S$, the comparator 34 outputs a deactivation signal and the sonotrode 14 is deactivated. Subsequently, the sonotrode can again be urged toward the anvil 16 with increased pressure force without any ultrasound activation to ensure a final cutting off of the marginal region.

A switching off of the ultrasound generator 26 can also take place when a deactivation signal D has not yet been generated, but the sonotrode 14 has been acted on by a predefined maximum energy or over a predefined time since in this case a processing with ultrasound going beyond this might damage the generated weld seam under certain circumstances. Once the adjustment force is increased again in the last step with a switched off sonotrode, the marginal section is also cut off as desired in this case. If no cutting and sealing is desired, but only a welding, the increase in the adjustment force in the last step can be omitted and the sonotrode can again be moved away from the anvil.

In the embodiment of the detector device shown in FIG. 2, the current source 32 generates a constant current of approximately 20 mA. The load resistor $R_L$ can be set in the range of approximately 1 kΩ. It is understood that these values are only exemplary. In every case, however, the load resistance should be selected as low as possible so that the static charges arising in the region of the films are led off without negatively influencing the desired contact switching off.

The invention claimed is:

1. An apparatus for welding or for cutting and sealing workpiece layers by means of ultrasound, comprising:
   at least one sonotrode;
   at least one anvil;
   a feed device, wherein the sonotrode and the anvil can be positioned relative to one another by the feed device; and
   a detector device which detects an electrical resistance between the sonotrode and the anvil and which generates a deactivation signal for the sonotrode and/or for the feed device in dependence on the determined resistance, wherein the detector device comprises:
   a first terminal point at the sonotrode;
   a second terminal point at the anvil;
   a current source, wherein the terminal points are both connected to the current source; and
   an electric load resistor, connected between the terminal points.

2. The apparatus of claim 1, wherein the electric load resistor is variable.

3. The apparatus of claim 1, wherein the load resistor is of low ohm resistance.

4. The apparatus of claim 3, wherein the load resistor has a resistance in the range from approximately 50-2000 ohms.

5. The apparatus of claim 4, wherein the load resistor has a resistance in the range from approximately 500-1000 ohms.

6. The apparatus of claim 2, wherein the load resistor has a resistance in the range from approximately 50-2000 ohms.

7. The apparatus of claim 6, wherein the load resistor has a resistance in the range from approximately 500-1000 ohms.

8. The apparatus of claim 1, wherein the current source is a constant current source which generates a current of approximately 5-1000 mA.

9. The apparatus of claim 1, wherein the current source is a constant current source which generates a current of approximately 10-30 mA.

10. The apparatus of claim 1, wherein the at least one sonotrode is a plurality of sonotrodes, wherein the at least one anvil is exactly one anvil; and wherein the detector device comprises a plurality of the first terminal points and exactly one second terminal point.

11. The apparatus of claim 1, wherein the at least one sonotrode is a plurality of sonotrodes, wherein the at least one anvil is a plurality of anvils; and wherein the detector device comprises exactly one first terminal point provided at the sonotrodes.

12. The apparatus of claim 10, wherein the sonotrodes or the anvil are fastened to a common carrier electrically insulated from one another.

13. The apparatus of claim 11, wherein the sonotrodes or the anvils are fastened to a common carrier electrically insulated from one another.

14. The apparatus of claim 1, wherein the detector device further comprises:
   a voltmeter which measures a voltage over the load resistor to thereby determine the resistance between the sonotrode and the anvil; and
   a comparator which compares the measured voltage with a limit value.

15. The apparatus of claim 14, wherein the limit value is adjustable.

16. A method for welding or for cutting and sealing workpiece layers by means of ultrasound while using an apparatus comprising at least one sonotrode and at least one anvil which can be positioned relative to one another by a feed device, wherein a detector device is provided which detects an electrical resistance between the sonotrode and the anvil and a deactivation signal is generated for the sonotrode and/or for the feed device in dependence on the determined resistance, the method having the following steps:
   a) activating the feed device at a predefined positioning force without activating the sonotrode or with activating the sonotrode at a low amplitude and positioning the sonotrode in the direction of the anvil to compress the workpiece layers;
   b) reducing the positioning force;
   c) activating the sonotrode or increasing the amplitude to a higher value; and
   d) deactivating the sonotrode and increasing the positioning force, in particular to approximately the original value, when the detector device has generated a deactivation signal.

17. The method of claim 16, wherein reducing the positioning force comprises reducing the positioning force by approximately half of the predefined positioning force.

18. The method of claim 16, further comprising deactivating the sonotrode when the detector device does not generate the deactivation signal, but the sonotrode is acted on by a predefined maximum energy or over a predefined time.

19. A method for welding workpiece layers, comprising:
   positioning a sonotrode and an anvil relative to one another by a feed device to thereby compress the workpiece layers between the sonotrode and the anvil;
   welding the workpiece layers with the sonotrode;
   detecting an electrical resistance between the sonotrode and the anvil to thereby measure the distance between the sonotrode and the anvil;
   generating a deactivation signal when the distance is below a threshold distance; and
   when the deactivation signal is generated, deactivating at least one of the sonotrode and the feed device, wherein deactivating the sonotrode stops the welding of the workpiece layers, and wherein deactivating the feed device stops the positioning of the sonotrode and the anvil relative to one another.

* * * * *